United States Patent
Lohr

(12) 
(10) Patent No.: US 6,267,093 B1
(45) Date of Patent: Jul. 31, 2001

(54) BONDED COMPOSITE INTAKE MANIFOLD

(75) Inventor: John Carl Lohr, Beverly Hills, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/631,134

(22) Filed: Aug. 2, 2000

(51) Int. Cl.[7] ................................................... F02M 35/10
(52) U.S. Cl. .................... 123/184.61; 264/328.2
(58) Field of Search ................... 123/184.61, 184.28, 123/184.38; 264/239, 328.2

(56) References Cited

U.S. PATENT DOCUMENTS

| | | |
|---|---|---|
| 2,623,571 | 12/1952 | Webber . |
| 4,111,163 | 9/1978 | Ederer et al. . |
| 4,301,775 | 11/1981 | Smart et al. . |
| 4,780,161 | 10/1988 | Mizuhara . |
| 5,294,273 | 3/1994 | Tripp . |
| 5,704,325 | 1/1998 | Sattler et al. . |
| 5,947,073 | 9/1999 | Chaffin et al. . |

FOREIGN PATENT DOCUMENTS 1286368   1/1962   (FR) .

Primary Examiner—Noah P. Kamen
(74) Attorney, Agent, or Firm—Carlos L. Hanze

(57) ABSTRACT

A plastic air intake assembly comprising, for example, upper and lower housing members with the upper member underside and the lower member upper side having a continuous 3-dimensional perimeter mating surface. The upper member mating surface being formed with a chamfered-shape in cross-section and the lower member mating surface being formed with a complementary chamfered-shape in cross-section. The mating surfaces are bonded together in an overlapping flush manner by suitable means, such as heat-cured adhesive, forming a continuous sealed scarf joint parting-line having a low profile with the mating surfaces lying in generally parallel planes with their associated housing wall portions.

10 Claims, 2 Drawing Sheets

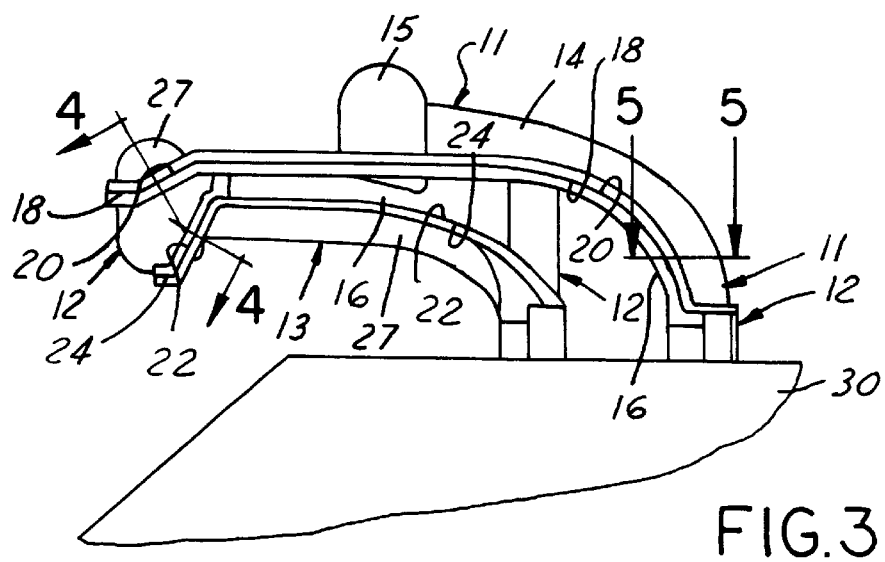
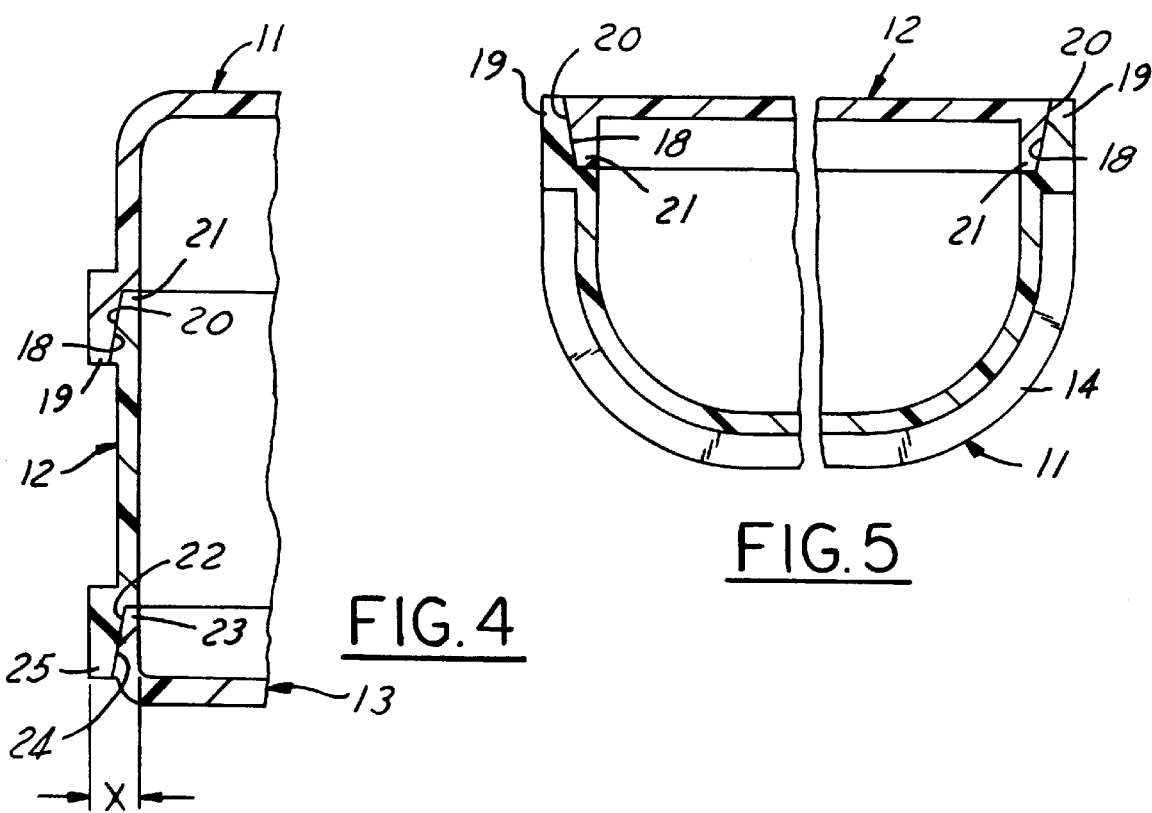

BONDED COMPOSITE INTAKE MANIFOLD

FIELD OF THE INVENTION

The present invention relates generally to plastic automotive air intake units and, more specifically, to an improved bonded joint design for an intake manifold assembly.

BACKGROUND OF THE INVENTION

As discussed in U.S. Pat. No. 5,947,073 to Chaffin et al., it is conventional to join plastic automotive air intake assemblies by means of linear vibration welding. Linear welding requires a relatively flat or 2-dimensional mating surface between the upper and lower housing parts. The two parts are placed within a vibration welding fixture and subjected to lateral displacement causing the mating surfaces between the parts to heat, soften, and fuse to one another.

In the case of highly contoured or 3-dimensional parts, vibration welding has proved unsatisfactory because of resulting lateral or linear displacement, creating weakened gaps in the vertical portions of the welds. The Chaffin patent teaches using a high frequency RF field to dielectrically heat an adhesive for bonding a first member tongue edge portion to a mating groove surface of a second member. The patent discloses an apparatus including a first continuous electrode that overlies the mating surfaces of the housing members. While the fabricating method of the Chaffin patent results in satisfactory welds, its use in the mass production of automotive parts is expensive as to labor and tooling costs as well as time consuming.

SUMMARY OF THE INVENTION

An object of the present invention is to provide an improved adhesive bonding arrangement and method for readily fabricating plastic air intake assemblies and the like for use in combination with internal combustion engines.

The above object is achieved and disadvantages of prior air intake assemblies overcome by employing scarf joints adapted for ready adhesive bonding between 3-dimensional contoured housing members, thereby obviating the use of the costly plastic fabricating methods, such as for example, dielectric heating procedures discussed above.

Another object of the invention is the reduction in manufacturing tolerances required for involved inter-fitting joint designs, such as a tongue and groove arrangement disclosed in the above patent, by providing overlapping scarf joints between the housing members adapted for ready bonding by suitable adhesives.

It is yet another feature of the invention to provide overlapping, scarf joints between the housing members creating low contour profiles for ease of molding and economy of space during mass production assembly of the air intake composite units.

A still further feature of the invention to provide a novel plastic intake assembly as set forth above which reduces the necessary manufacturing tolerances on the plastic housing members.

According to the present invention, there is provided a plastic automotive air intake housing assembly for routing air or air/fuel mixtures to engine cylinder head ports. The assembly comprises two or more housing shell-type plastic members each having a 3-dimensional perimeter mating surface, with the mating surfaces bonded together in a continuous scarf joint parting-line with its flush mating surfaces sealed by an adhesive.

In the disclosed embodiment herein the air intake unit includes a 3-piece air intake manifold assembly involving a first upper housing member, a second intermediate housing member, and a third lower housing member. The upper housing member is molded with an underside 3-dimensional surface having a chamfered-shape in cross section. The intermediate member is molded with an upper side perimeter mating surface having a chamfered-shape in cross section that is complementary to the first housing member mating surface, and an underside perimeter mating surface having a chamfered-shape in cross section. The lower housing member is molded with an upper side perimeter mating surface having a chamfered-shape in cross-section that is the complement of the intermediate member underside chamfered-shape mating surface. With the flush mating surfaces being bonded with adhesive and heat cured the assembly is secured by first and second parting lines.

BRIEF DESCRIPTION OF THE DRAWINGS

The features and advantages described herein will be more fully understood by reading an example of an embodiment in which the invention is used to advantage, referred to herein as the Description of the Preferred Embodiment, with reference to the drawings wherein:

FIG. 3 is an enlarged, fragmentary, cross-sectional view taken on the line 3—3 of FIG. 1;

FIG. 4 is an enlarged, fragmentary, cross-sectional view taken on the line 4—4 of FIG. 3; and FIG. 5 is an enlarged, fragmentary, cross-sectional view taken on the line 5—5 of FIG. 3.

DETAILED DESCRIPTION OF THE PREFERRED EMBODIMENT

Figure 1:
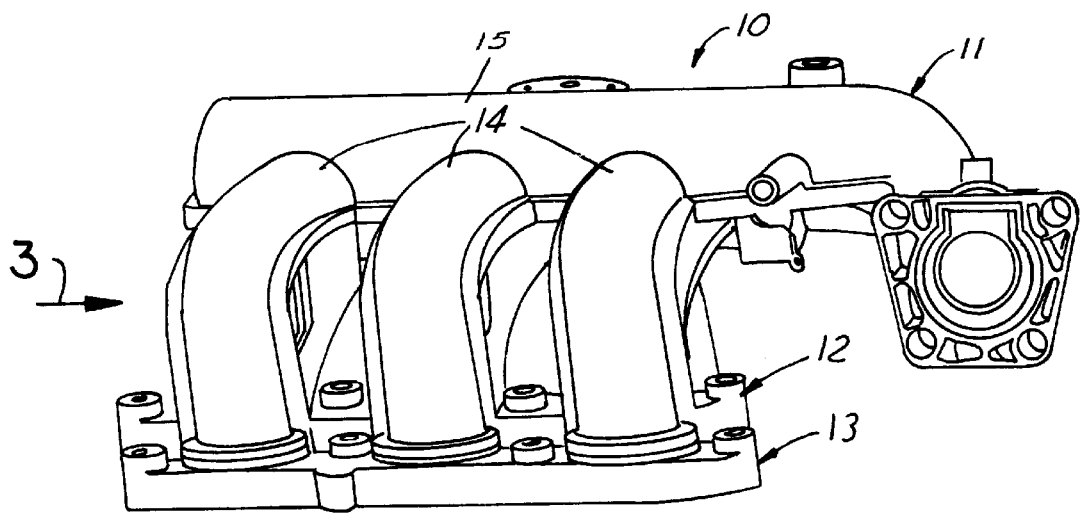
FIG. 1 is a perspective view of a three-member plastic automotive air intake assembly for an internal combustion engine in accordance with the invention.
Figure 2:
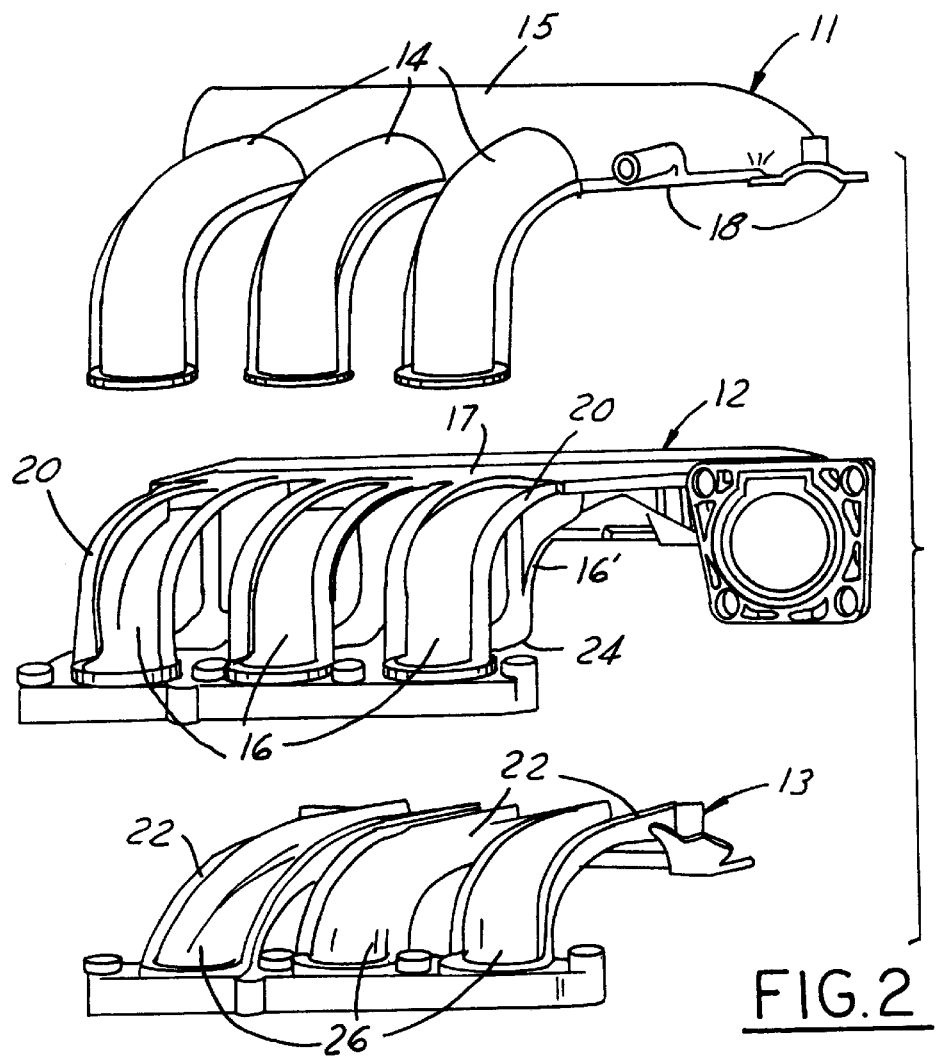
FIG. 2 is an exploded perspective view of the assembly shown in FIG. 1.

Referring to FIGS. 1 and 2 of the drawings, a 3-piece automotive air intake manifold assembly, molded from a suitable plastic material such as a glass-filled nylon, is generally indicated at 10. As seen in FIG. 2 the assembly 10 comprises three shell-like housing members, namely a first upper housing member 11, a second intermediate housing member 12, and a third lower housing member 13.

The upper member 11 comprises a wall section, defined partly by upper-half portions of a first bank of three air/fuel divided runners or passages 14 and an upper portion of a first air inlet plenum 15. The runners 14 feed out from the inlet plenum 15 for routing the air/fuel mixture to respective ones of three engine cylinder head ports (not shown). The intermediate member 12 comprises a first wall section defined by three lower-half portions of the first bank of runners, shown at 16 in FIG. 2, and the lower portion 17 of the inlet plenum 15.

Intermediate member has a second wall section, partially indicated at 16' in FIGS. 2 and 3, is formed on its underside with upper-half portions of a second bank of 3 runners. The second wall section upper-half 3 runners are adapted for bonding with their respective lower-half portions, shown at 26 in FIG. 2. The second lower bank of 3 runners, which feed-out from a second plenum shown at 27 in FIG. 3, feed air/fuel mixture to respective ones of three remaining engine cylinder ports (not shown).

As seen in FIGS. 2 and 3, the assembly upper housing member 11 has its underside molded with a continuous 3-dimentionial perimeter mating surface 18, having a chamfered-shape in cross-section formed on end portion 19. The intermediate member 12 has its first wall section end portion 21 upper side molded with a continuous 3-dimensional perimeter mating surface 20, having a chamfered-shape in cross-section. The mating surface 20 is complementary to, i.e. a mirror image, of upper member mating surface 18 (FIGS. 4 and 5). Together the mated flush lapped surfaces 18 and 20 form a continuous sealed scarf joint defining an assembly first parting-line bonded by suitable means, such as a heat-cured adhesive.

With reference to FIGS. 4 and 5, the lower housing member 13 has its upside molded with a 3-dimensional perimeter mating surface 22, formed on its wall end portion 23, having a chamfered-shaped in cross-section. The lower member mating surface 22 is positioned complementary to the shape of intermediate housing member underside mating surface 24 formed on end portion 25 of a second wall section 16'. With the mating surfaces 22 and 24 in flush contact they define a second parting-line adapted for sealing by suitable bonding means such as a heat-cured adhesive.

Although it will be noted that it is not the intent to limit the invention to one type of bonding means, a heat-cured adhesive is used in the disclosed embodiment. As a final step, the assembly 10 is placed in a heating kiln or oven and subjected to a predetermined elevated temperature to promote curing of the adhesive. Upon the air intake manifold assembly 10 being cured its first parting-line, defined by the mating surfaces 18 and 20; and its second parting line, defined by the mating surfaces 22 and 24, are sealed in an airtight manner.

An example of one plastic molding material adapted for use in the present intake manifold assembly is BASF Polyamide 66, comprising 35% glass reinforced polymer (Ultramid A3HG7Q17). The housing members may also be made from other thermoplastic material having a designation "nylon 6" or "nylon 66" which are glass filed in an amount by weight of the order of 30%.

In the preferred manifold construction each scarf-joint, as defined by mating surfaces 22 and 24, has an overall cross-section thickness dimension "X" of the order of 5 mm., with the associated housing wall portions having a thickness about one-half dimension "X", i.e. about 2.5 mm. It will be appreciated that prior art plastic air intake assemblies, such as a tongue and groove type joint, disclosed in the Chaffin patent, have an overall cross sectional dimension of the order of 10 mm. In the present invention a low profile, overlapping scarf joint dimension of 5 mm is achieved by each half of the scarf joint lies in a plane substantially parallel to its associated housing wall. As a result, applicant has achieved an air intake manifold construction that reduces both design and fabrication costs.

While the best modes for carrying out the invention have been described in detail, those skilled in the art in which this invention relates will recognize various alternative designs and embodiments, including those mentioned above, in practicing the invention that has been defined by the following claims.

What is claimed is:

1. A plastic automotive air intake assembly comprising:
   first and second housing members, the first member having a continuous 3-dimensional perimeter mating surface on its underside and the second member having a continuous 3-dimensional perimeter mating surface on its upper side;
   each first and second member mating surface having a chamfered-shape in cross-section, with the mating surfaces being oriented in complementary opposed relation to each other; and
   the first member mating surface being in overlapping flush contact with the second member mating surface with bonding means between the mating surfaces, whereby the mating surfaces are secured in a continuous sealed scarf joint defining an assembly parting-line between the housing members.

2. The air intake assembly of claim 1 wherein each housing member having wall means with a thickness dimension of the order of one-half the overall cross-sectional dimension of the scarf joint.

3. The air intake assembly of claim 2 wherein each member wall means terminating in a continuous end portion forming an associated mating surface of the scarf joint, the scarf joint having a low profile substantially conforming to the contour of its associated housing wall means.

4. The air intake assembly of claim 1, wherein each housing member molded of is a heat-cured glass reinforced nylon plastic material.

5. An automotive air intake assembly comprising:
   an upper housing member having wall means terminating in an end portion formed with a continuous 3-dimensional perimeter mating surface on its under side having a chamfered-shape in cross-section, an intermediate housing member having first wall means terminating in an end portion formed with a continuous 3-dimensional perimeter mating surface on its upper side having a chamfer-shape in cross-section and second wall means formed with a continuous 3-dimensional perimeter mating surface on its underside formed with a chamfered-shape in cross-section, and a lower housing member having wall means terminating in a continuous 3-dimensional perimeter end portion formed with a mating surface on its upper side having a chamfered-shape in cross-section;
   the upper member mating surface formed in a complementary opposed mirror image manner with the intermediate member first wall means mating surface for flush overlapping bonding contact therewith forming a continuous sealed first scarf joint parting-line between the assembly upper and intermediate members, and the lower member mating surface formed in a complementary opposed mirror image manner with the intermediate member second wall means mating surface for flush overlapping bonding contact therewith forming a continuous sealed second scarf joint parting line between the assembly lower and intermediate members.

6. The air intake assembly of claim 5 wherein each housing member wall means has a thickness dimension of the order of one-half the overall thickness dimension of its associated scarf joint.

7. The air intake assembly of claim 5 wherein the scarf joint has a low profile substantially conforming to the contour of its associated housing wall means.

8. The air intake assembly of claim 5 wherein the bonding contact between each first and second scarf joint parting line pair of mating surfaces in the form of a heat-cured adhesive.

9. The air intake assembly of claim 5 wherein each housing member molded from a thermoplastic glass reinforced plastic material.

10. A method for manufacturing an automotive air intake assembly for an internal combustion engine consisting of:
   molding an upper housing member with wall means formed on its underside with a continuous perimeter 3-dimensional mating surface having a chamfer-shape in cross-section;

molding an intermediate housing member with first and second wall means, the first wall means formed on its upper side with a continuous perimeter 3-dimensional mating surface having a chamfered-shape in cross-section, complementary to the first member mating surface, and the second wall means formed on its underside with a continuous perimeter 3-dimensional mating surface;

molding a third lower housing member with wall means formed on its upper side with a continuous perimeter 3-dimensional mating surface having a chamfered-shape in cross-section, complementary to the intermediate member second wall means mating surface;

applying a continuous bead of heat-activated adhesive on each mating surface;

placing the upper member mating surface in overlapping flush adhesive contact with the intermediate member first wall means mating surface, defining a first scarf-joint parting line;

placing the lower member in overlapping flush adhesive contact with the intermediate member second wall means mating surface, defining a second scarf-joint parting line; and subjecting the three member assembly to a source of heat so as to raise the adhesive to a predetermined temperature for a set time interval, whereby the adhesive is heat-cured bonding the first and second scarf joint mating surfaces at their associated parting lines completing the air intake assembly.

* * * * *